Dec. 22, 1970  K. BECKER  3,548,677
TRANSMISSION
Filed Dec. 31, 1968  2 Sheets-Sheet 2

INVENTOR
Kurt BECKER

United States Patent Office 3,548,677
Patented Dec. 22, 1970

---

3,548,677
TRANSMISSION
Kurt Becker, Obernkirchen, Germany, assignor to
Hermann Heye, Obernkirchen, Germany
Filed Dec. 31, 1968, Ser. No. 788,125
Claims priority, application Germany, Jan. 9, 1968,
1,704,112
Int. Cl. F16h 37/06
U.S. Cl. 74—665           11 Claims

ABSTRACT OF THE DISCLOSURE

A transmission wherein two or more axially spaced driven internal gears are rotatable about a common vertical axis and carry outwardly extending output members. Each gear is driven by a separate electric motor by way of a step-down transmission. The operation of motors is controlled by a programming system.

BACKGROUND OF THE INVENTION

The present invention relates to transmissions in general, and more particularly to improvements in transmissions which can be utilized to transmit motion to a plurality of driven parts in desired sequence, at a desired speed and through desired distances.

SUMMARY OF THE INVENTION

An object of the invention is to provide a transmission which can transmit rotary motion to two or more driven parts at one or more speeds, through identical or different distances and/or at identical or different intervals.

Another object of the invention is to provide a compact transmission which is designed in such a way that its operation can be controlled by electronic, electromechanical or other types of programming systems.

A further object of the invention is to provide a transmission which is particularly suited for use in a bottle making or like machine wherein parisons, gobs, partly finished bottles, finished bottles or analogous workpieces must be transported along a predetermined path and in a predetermined sequence.

An additional object of the invention is to provide a transmission with two or more orbiting output members wherein each output member can be driven or held at a standstill independently of the other output member or members.

The improved transmission comprises a case, a plurality of coaxial driven elements rotatably mounted in the case preferably in such a way that they rotate about a common vertical axis and each provided with a preferably outwardly extending arm or an analogous output member, a separate prime mover (preferably including an electric motor and a step-down transmission interposed between the output shaft of the motor and the corresponding driven element) for each of the driven elements, and programming means for controlling the operation of prime movers so that the output members can be moved about the axis of the driven elements at the same speed, at different speeds, at identical or different intervals and/or through identical or different distances. The driven elements are preferably internal gears or spur gears which are axially spaced from each other and mesh with pinions forming part of the respective prime movers. The case of the transmission can be mounted on a column or a like support which is preferably coaxial with the driven elements and which can carry a platform or cover for the prime movers. These prime movers are preferably mounted at a level above or below the case of the transmission.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
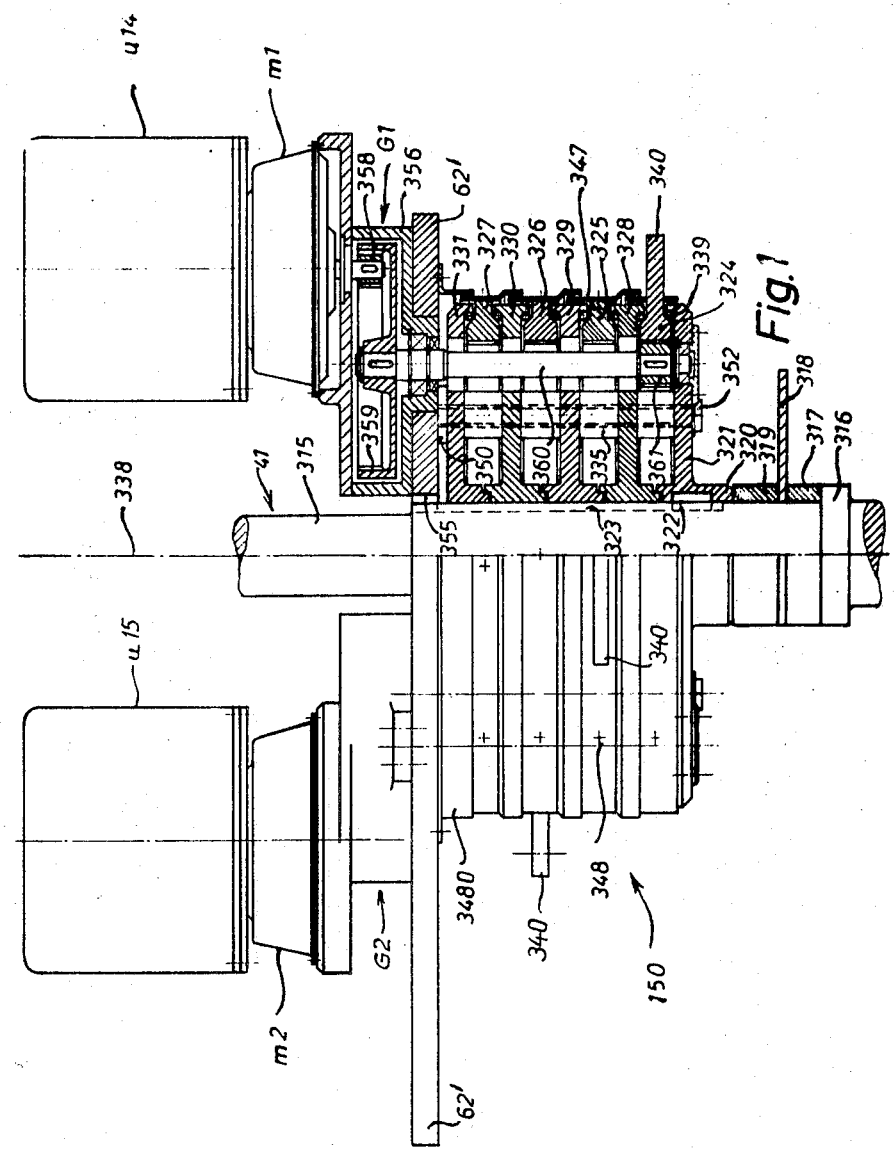
FIG. 1 is a partly elevational and partly sectional view of a transmission with four output members which embodies one form of my invention.

FIG. 1 illustrates the details of a transmission 150. A support here shown as a column 41 has a portion or section 315 provided with a shoulder 316 which supports a distancing ring 317 supporting a lower platform 318 to carry cams regulating further functions of the output members in accordance to the angular positions. The platform 318 further supports a second distancing ring 319 which abuts against the lower end of a hub 320 extending from a bottom wall 321 forming part of the case of the transmission 150. The hub 320 is held against rotation by a key 322 which extends into an axially parallel groove 323 of the section 315. The bottom wall 321 carries a stack of driven elements here shown as axially spaced internal gears 324, 325, 326, 327 which are separated by disks 328, 329, 330. Each of these disks has a hub which surrounds the section 315. A similar hub is provided on a top wall 331 of the transmission case which is located above the topmost gear 327. All of the hubs are accurately centered on the section 315 against uncontrolled radial movement. These hubs are spaced axially from each other by distancing elements 335 which are disposed between the disks 328, 329, 330, between the disk 328 and bottom wall 321 and between the disk 330 and top wall 331. The transmission 150 further comprises annuli of spherical rolling elements 339 which are interposed between superimposed parts (such as between the bottom wall 321 and adjoining gear 324). The rolling elements 339 engage tracks provided by surfaces which are inclined with reference to the axis 338 of the column 41. Such inclination of surfaces which form the tracks insures satisfactory guidance of rolling elements 339 against radial movement. Washers which are installed between the distancing elements 335 and the adjoining parts insure requisite axial positioning of rolling elements 339.

Each of the gears 324–327 has a radially outwardly extending output member or arm 340, and each of these output members carries a driven part, e.g., a holder for neck rings of a bottle making machine. The length of each of the four driven parts which receive motion from the transmission 150 is different so that the neck rings carried by such driven parts are located in a common plane which is normal to the axis 338.

Each of the four gears 324–327 in the transmission 150 is surrounded by a ring 347 which forms part of the transmission case and is secured to the respective gear by screws 348. The rings 347 overlap each other and thus protect the rolling elements 339 against penetration of dust. The topmost ring 347 cooperates with a further ring 3480 which has a flange secured to a second platform or cover 62'. The latter rests on distancing elements 350 which in turn abut against the top wall 331. The distancing elements 335, 350, the bottom wall 321, the top wall 331 and the disks 328–330 are formed with registering bores which accommodate clamping bolts 352 screwed into the cover 62'. The transmission 150 comprises several bolts 352; their function is to hold the walls 321, 331 against relative movement axially of the gears 324–327. A key 355 holds the cover 62' against turning on the column 41. The top face of the cover 62' has four recesses each of which accommodates a portion of one of four housings 356 for the corresponding step-down transmissions (e.g., $G_1$) which are driven by electric motors (e.g., $m_1$). The transmission $G_1$ is mounted at a level below the motor $m_1$ and the latter is mounted below a photoelectric signal generator $u14$ forming part of a programming system for the transmission 150. The motor $m_1$ is bolted to the housing 356 of the transmission $G_1$ and its downwardly extending output shaft carries a pinion 358 which drives an internal gear 359. The latter is mounted on a shaft 360 which is journalled in the corresponding housing 356 and in the bottom wall 321 of the case of transmission 150. Each shaft 360 carries a pinion 361 which meshes with one of the internal gears 324–327.

In accordance with a modification which is not shown in the drawing, the internal gears 324–327 can be replaced by spur gears with external teeth. Each spur gear then comprises an external portion which is without teeth and is rigid with the corresponding output member 340.

The parts 321, 328–331 constitute separating means for the internal gears 324–327 and the two outermost separating means 321, 331 form part of the transmission case. The section 315 constitutes a centering means for the parts 321 and 324–331.

The drawing further shows a second electric motor $m_2$ which drives a second shaft (not shown) by way of a second step-down transmission $G_2$. For example, the shaft 360 of the transmission $G_2$ can drive the internal gear 325. The remaining two motors and their transmissions are not shown in the drawing. The signal generator for the motor $m_2$ is shown at $u15$. Each motor $m$ and the corresponding transmission G constitutes a prime mover for one of the driven elements 324–327. A complete programming system which can control the operation of the four motors including the motors $m_1$ and $m_2$ is disclosed in my copending application Ser. No. 786,899.

Figure 2:
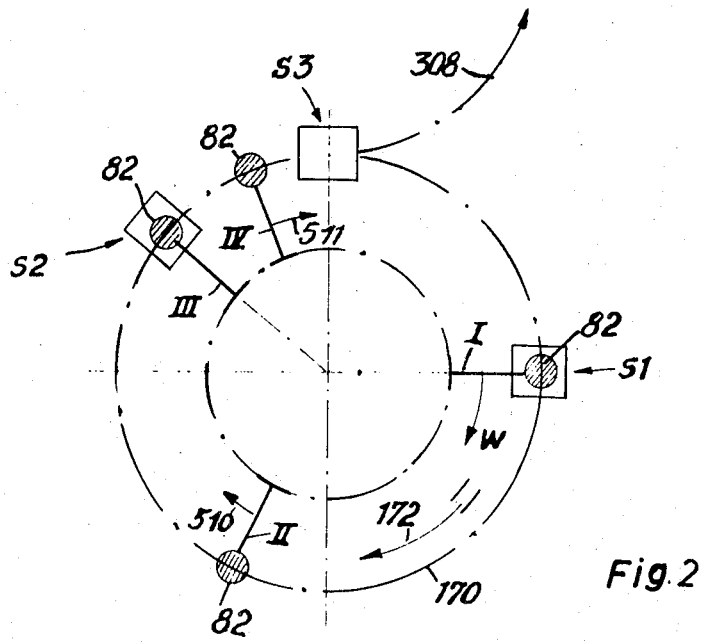
FIG. 2 is a schematic top plan view of the four output members.

FIG. 2 illustrates schematically four output members I, II, III and IV each of which corresponds to one of the output members 340 shown in FIG. 1. The output members I–IV are driven by gears 324–327 and each thereof advances a driven part here shown as a holder for a neck ring 82. The centers of neck rings 82 travel along an endless circular path 170 in the direction indicated by arrow 172. The center of the path 170 is located on the axis 338 of the column 41 (see FIG. 1). The neck rings 82 travel from a first treating station S1 to a second treating station S2 and back to the first station S1 by way of a third station or transfer station S3. The neck rings 82 come to a full stop at each of the stations S1 and S2 but not at the station S3. In order to increase the output of the machine which embodies the transmission 150, the periods of dwell of neck rings 82 at the stations S1 and S2 and the intervals between the dwells of successive neck rings 82 at these stations are reduced to a minimum.

Figure 3:
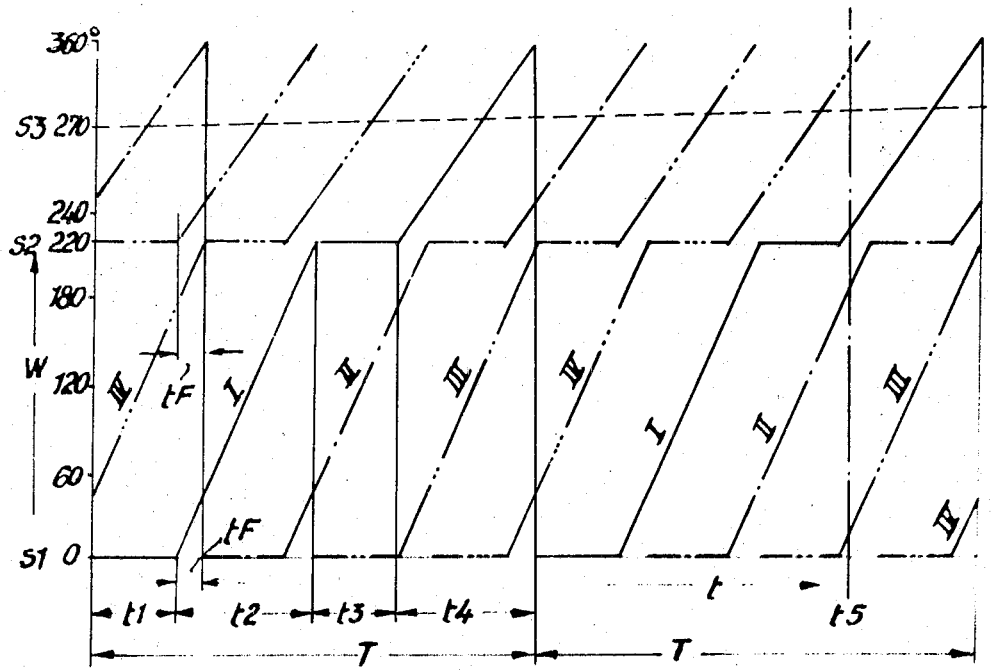
FIG. 3 is a diagram showing one mode of programming the operation of my transmission.

In that stage of operation which is shown in FIG. 2, the output member I dwells at the first station S1. When the output member I is set in motion again, its angular displacement W progresses in a manner as illustrated in the graph of FIG. 3 wherein the angular displacement W is measured along the ordinate and the time $t$ along the abscissa. The output member II is in motion (arrow 510) and travels toward the second station S2. The workpiece carried by the neck ring 82 on the output member II is being treated while the member II is in motion toward the station S2. The output member IV advances toward the transfer station S3 (arrow 511) and carries a finished workpiece (not shown) which is about to descend or to be otherwise transferred onto a takeoff conveyor 308. If the finished workpiece is a freshly formed bottle which is obtained by blowing of a parison, the conveyor 308 can advance the finished bottle to a lehr. The output member III dwells at the station S2. The transfer of finished workpieces at the station S3 can take place without stoppage or even without deceleration of the corresponding output members.

Referring to FIG. 3, the angular displacement W of output members I to IV is measured in degrees along the ordinate. The inclined portions of the curves indicate the intervals when the output members are in motion and the horizontal portions of such curves denote the dwells of output members at the stations S1 and S2. For the sake of clarity, the curves denoting movements of the output member I are indicated by heavy solid lines. This output member I dwells at the station S1 for an interval $t_1$, the member I thereupon travels toward the station S2 during an interval $t_2$, the member I then dwells at the station S2 for an interval $t_3$, and the transport of member I back to the station S1 (by way of the station S3) takes up an interval $t_4$. The total cycle takes up an interval $$T = t_1 + t_2 + t_3 + t_4$$

FIG. 3 further shows that one or more output members II, III, IV are in motion when the output member I dwells at the station S1 or S2, and vice versa. FIG. 3 also shows that the stations S1 and S2 are occupied during the major part of each cycle T, i.e., that the parts at the stations S1 and S2 are utilized with nearly maximum efficiency (almost without interruption). The characters $t_F$ denote the very short intervals during which the stations S1 and S2 are empty. As a rule, each fresh cycle T begins immediately upon completion of the preceding cycle. As shown by the line $t_5$, all four output members I to IV can be kept in motion during certain stages of a cycle T. The programming system which includes the signal generators $u$ for the motors $m$ of the transmission 150 is preferably designed in such a way that the operator or operators can select any desired combination of dwells and movements for each of the four output members. Reference may be had to the programming system which is illustrated in FIGS. 18 to 25 of my aforementioned copending application Ser. No. 786,899.

The transmission may also include two, three, five or more output members and an equal number of driven elements and prime movers.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A transmission comprising a case; a plurality of coaxial driven elements rotatably mounted in said case, each of said driven elements having an output member; and a plurality of separate prime movers, one for each driven element, for driving the respective driven element independent of the others.

2. A transmission as defined in claim 1, wherein said driven elements comprise first gears which are axially spaced from each other and wherein each of said prime movers comprises a second gear meshing with the respective first gear.

3. A transmission as defined in claim 2, wherein said output members extend outwardly from the respective first gears.

4. A transmission as defined in claim 1, wherein each of said prime movers comprises an electric motor and a transmission interposed between the motor and the respective driven element.

5. A transmission as defined in claim 4, wherein said last mentioned transmissions are step-down transmissions.

6. A transmission as defined in claim 1, wherein each of said driven elements is an internal gear, said prime movers comprising shafts journalled in said case in parallelism with the common axis of said driven elements and each having a pinion meshing with the respective internal gear.

7. A transmission as defined in claim 6, further comprising a support for said case, said support being coaxial with said gears and said shafts being equidistant from and parallel to said support.

8. A transmission as defined in claim 1, further comprising distancing elements interposed between said driven elements and between said drive elements and said case.

9. A transmission as defined in claim 1, further comprising antifriction bearing means interposed between said driven elements and said case.

10. A transmission as defined in claim 1, wherein said prime movers are mounted on and have portions extending into said case.

11. A transmission as defined in claim 1, wherein said driven elements are axially spaced from each other and are located at a first level, said prime movers being located at a second level and said output members extending substantially radially of and outwardly from the respective driven elements.

References Cited
UNITED STATES PATENTS

| | | | |
|---|---|---|---|
| 625,003 | 5/1899 | Whiting | 74—665X |
| 2,395,443 | 2/1946 | Barraja-Frauenfelder et al. | 74—665X |
| 2,614,181 | 10/1952 | Consalvi et al. | 74—665X |
| 2,896,951 | 6/1961 | Carriol | 74—665X |

ARTHUR T. McKEON, Primary Examiner